United States Patent [19]
Goto et al.

[11] Patent Number: 5,543,872
[45] Date of Patent: Aug. 6, 1996

[54] CAMERA EQUIPPED WITH AN INFORMATION RECORDING APPARATUS

[75] Inventors: Tetsuro Goto, Funabashi; Tsutomu Wakabayshi, Yokohama, both of Japan

[73] Assignee: Nikon Corporation, Tokyo, Japan

[21] Appl. No.: 536,466

[22] Filed: Sep. 29, 1995

Related U.S. Application Data

[63] Continuation of Ser. No. 274,375, Jul. 13, 1994, abandoned, which is a continuation of Ser. No. 159,946, Nov. 29, 1993, abandoned, which is a continuation of Ser. No. 760,125, Sep. 16, 1991, abandoned.

[30] Foreign Application Priority Data

Sep. 20, 1990 [JP] Japan ................................ 2-250526

[51] Int. Cl.⁶ ........................................... G03B 17/24
[52] U.S. Cl. ............................................. 354/106
[58] Field of Search ............................... 354/75, 76, 105, 354/106, 173.11

[56] References Cited

U.S. PATENT DOCUMENTS 4,664,491  5/1987  Kazumi et al. ..................... 354/105
5,028,942  7/1991  Kirigaya .............................. 354/106
5,272,498  12/1993  Wakabayashi ...................... 354/105

*Primary Examiner*—David M. Gray
*Attorney, Agent, or Firm*—Shapiro and Shapiro

[57] ABSTRACT

In a camera having magnetic recording apparatus for recording information regarding photograph film frames, a controller determines when a recording head engages a recording medium in accordance with different photographing modes. In a single-frame mode the recording head engages the recording medium for recording during single-frame film advancement after a single-frame exposure and then is disengaged from the medium. In a continuous mode the recording head may engage the medium only during a single-frame film advancement after exposure of a plurality of film frames, and stored information regarding all of the plurality of exposed film frames is then recorded collectively. Alternatively, stored information may be recorded frame-by-frame during film rewind. In a modification, the recording head is maintained engaged with the medium during continuous photographing, for frame-by-frame recording.

17 Claims, 10 Drawing Sheets

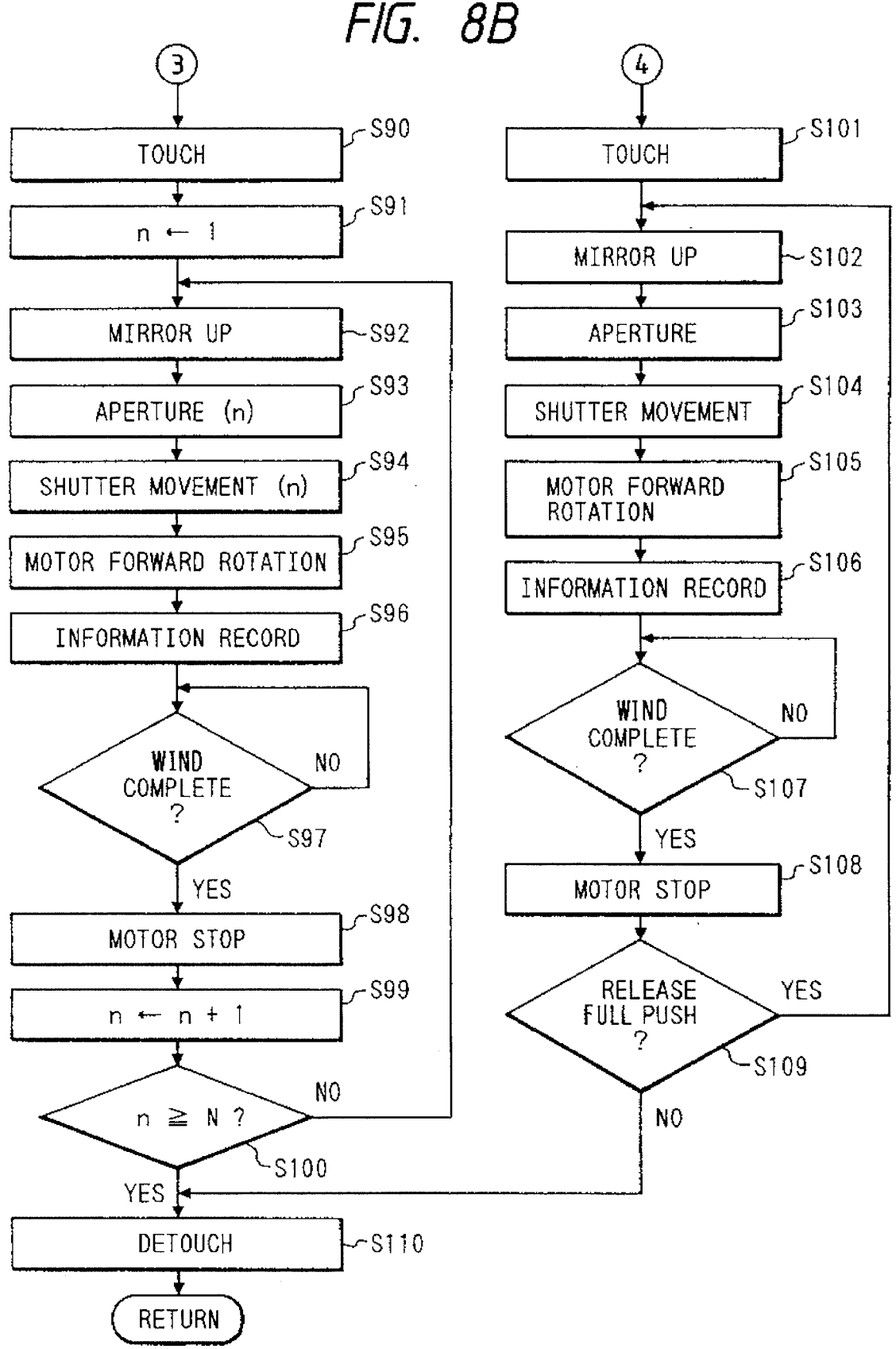

CAMERA EQUIPPED WITH AN INFORMATION RECORDING APPARATUS

This is a continuation of application Ser. No. 08/274,375 filed Jul. 13, 1994, which is a continuation of application Ser. No. 08/159,946 filed Nov. 29, 1993, which is a continuation of application Ser. No. 07/760,125 filed Sep. 16, 1991, all now abandoned.

BACKGROUND OF THE INVENTION

1. Field of the Invention

This invention relates to a camera equipped with an information recording apparatus for recording various information on film or a cartridge, etc.

2. Related Background Art

A camera equipped with a recording apparatus for recording various information on the magnetic recording medium on film has been proposed.

FIG. 9 shows a camera 1 of this type and a film cartridge 2 to be used therefor.

The cartridge 2 is loaded into a film chamber 3 in the camera 1, and film 4 drawn out of the cartridge 2 passes an aperture 5 and is wound by a winding spool 6. Each photograph frame on the film 4 is positioned at a position opposite to the aperture 5 for exposure.

A magnetic track 7 is provided at least length-wise at the bottom of the exposed screen on the film 4, and a magnetic head 8 is provided at the notch of a pressure plate 10 for a back cover 9 so that the magnetic head 8 is opposite to the magnetic track 7.

After each photograph frame on the film 4 is exposed by a shutter (not shown) within the aperture 5, the film 4 for one frame is wound up by the winding spool 6. Synchronizing with feeding of this one frame, the information on the photographing is recorded on the magnetic track 7 by the magnetic head 8.

The magnetic head 8 is always kept away (dissengaged) from the magnetic track 7 on the film 4 (hereinafter called "detouch state"), and comes into contact (engaged) with the film 4 only during recording (hereinafter called "touch state"). This is because dust or dirt easily sticks to the magnetic head 8 if it is always left in contact with the film 4. Therefore, the magnetic head 8 is allowed to come into contact with the film 4 before feeding one frame after exposure, and is detouched from the film 4 when recording of the information is completed.

Cameras capable of continuously photographing at high speed such as a bracketing photograph mode and a high-speed, continuous wind photograph mode have been put to practical use. In the bracketing photograph mode, the same object for photographing is continuously photographed for a plurality of frames by changing the exposure by stages when it is difficult to determine the appropriate exposure value for photographing, and the like. In the high-speed, continuous wind photograph mode, a moving object for photographing is continuously photographed by chasing the object.

On photographing in such a high-speed, continuous photograph mode, the film for each exposure should be fed at high speed so as not to miss photographing opportunities that might be missed if the photograph time interval became longer.

SUMMARY OF THE INVENTION

In a camera equipped with a conventional information recording apparatus, since the touch and detouch of the magnetic head are repeated for each exposure of each photograph frame to record the photographing information for each photograph frame, the photograph time interval will be longer due to the touch and detouch duration for the magnetic head on photographing in the high-speed, continuous photograph mode. As a result, there is a problem that photographing opportunities will be missed or satisfactory high-speed, continuous photographing cannot be performed.

It is an object of the present invention to provide a camera equipped with an information recording apparatus capable of securely recording the photographing information for each photograph frame and at the same time, photographing at high speed continuously.

Referring to the diagram of FIG. 1A, the above-mentioned object of the present invention can be accomplished by having selecting means SW5 and SW6 for selecting the high-speed, continuous photograph mode, in which continuous photographing is performed at high speed while recording the photograph scene for each photograph frame on first recording medium 4, second recording medium 7 for recording the information on photographing for each photograph scene, record means 8, which is kept away from the second recording medium 7 when not recording and records the photographing information on the second recording medium 7 by touching it during recording, memory means 30m for storing the photographing information, and controlling means 30 which allows the record means 8 to touch and be kept away from the second recording medium for each photograph frame, for recording the photographing information when normally photographing, and when the high-speed, continuous photograph mode is selected through the selecting means SW5 and SW6, allows the memory means 30m to store the photographing information while keeping the record means 8 away from the second recording medium 7 as photographing is performed in this mode.

In a camera equipped with an information recording apparatus according to the invention, the first recording medium 4 may be a silver salt film, and the second recording medium 7 may be a magnetic recording medium provided on this silver salt film.

A camera equipped with an information recording apparatus according to a modification of the invention will be described referring to the diagram of FIG. 1B. The present invention can be accomplished by having selecting means SW5 and SW6 for selecting the high-speed, continuous photograph mode, in which continuous photographing is performed at high speed while recording the photograph scene for each photograph frame on first recording medium 4, second recording medium 7 in which the photographing information for each photograph screen is recorded, record means 8, which is kept away from the second recording medium 7 when not recording and records the photographing information on the second recording medium 7 by touching it during recording, and controlling means 30 which allows the record means 8 to touch and be kept away from the second recording medium 7 for each photograph frame, for recording the photographing information when normally photographing, and when the high-speed, continuous photograph mode is selected through the selecting means SW5 and SW6, allows the record means 8 to record, on the second recording medium 7, the photographing information for each photograph screen by bringing the record means 8 into contact with the second recording medium 7 while photographing is being performed in this mode.

BRIEF DESCRIPTION OF THE DRAWINGS

FIGS. 8A and 8B are flow charts showing examples of modification of the release subroutine.

DESCRIPTION OF THE PREFERRED EMBODIMENTS

Figure 1A:
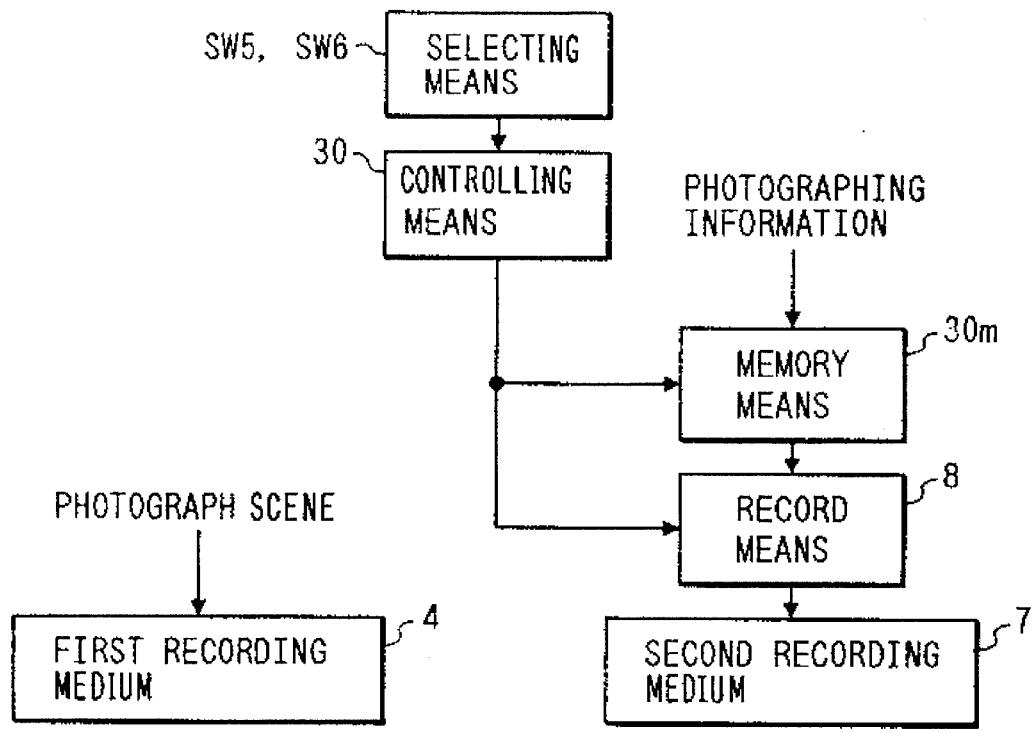
FIGS. 1A and 1B are diagrams illustrating general principles of the invention.
Figure 1B:
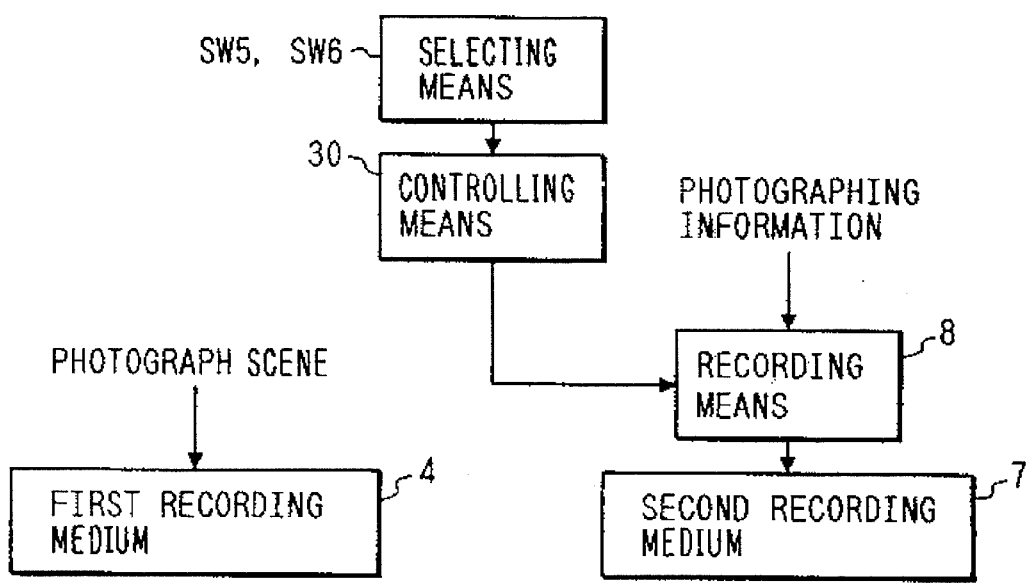
Figure 2:
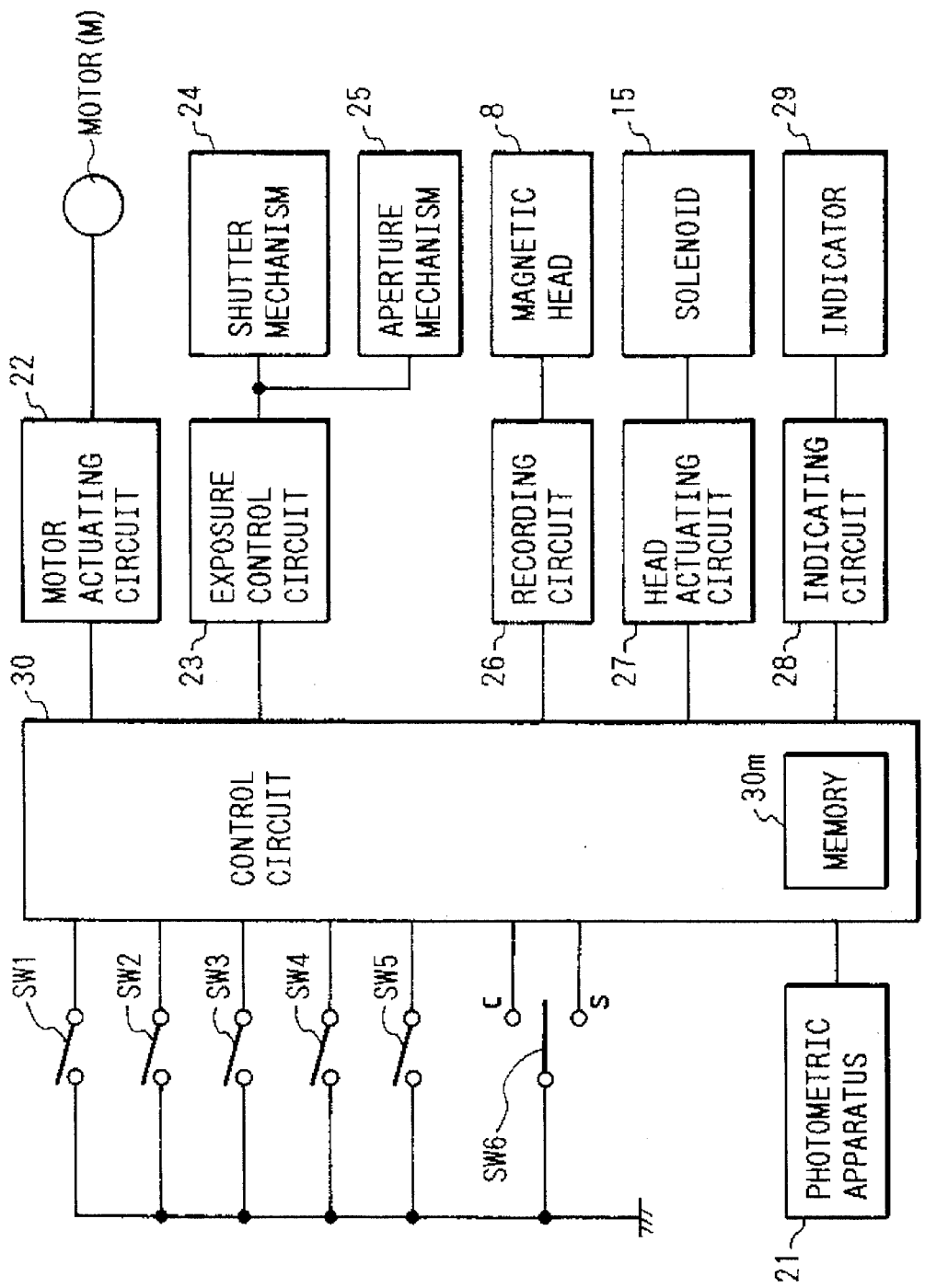
FIG. 2 is a block diagram showing the overall construction of an embodiment according to the present invention.
Figure 3:
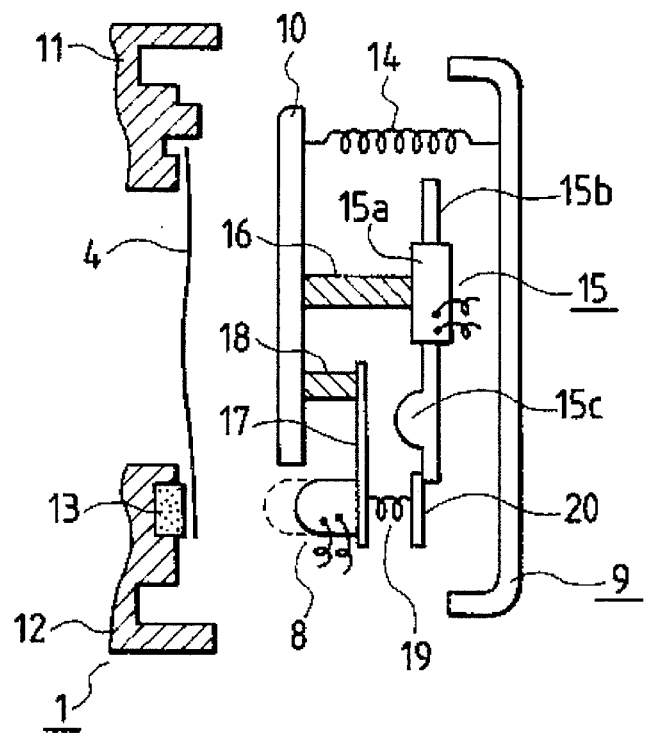
FIG. 3 is a section view of a camera showing the actuating mechanism of a magnetic head according to the present invention.
Figure 9:
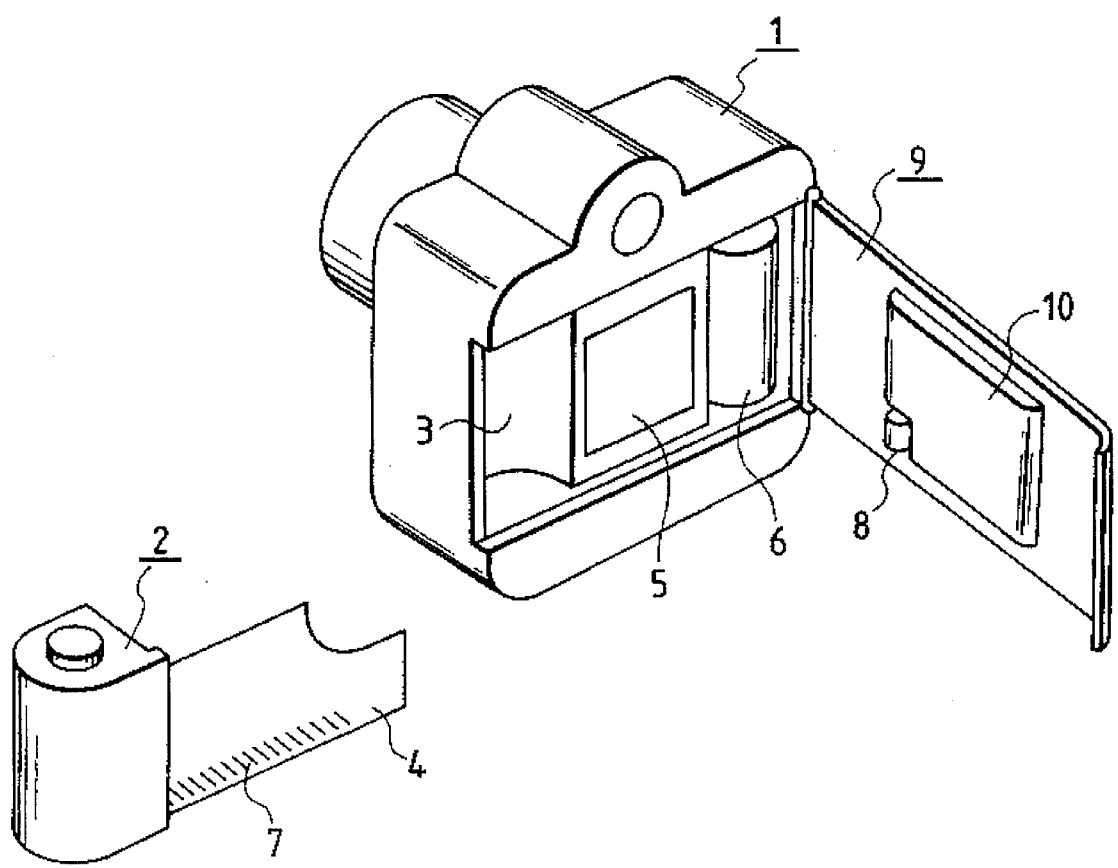
FIG. 9 is a view showing a camera equipped with a conventional information recording apparatus.

FIG. 2 is a block diagram showing the overall construction of an embodiment according to the present invention, and FIG. 3 is a longitudinal sectional view of the camera back cover showing a magnetic head actuating mechanism for allowing the magnetic head to touch and detouch the film. For similar equipment to FIG. 9 showing a conventional camera, the same symbols are used in FIG. 3 to avoid unnecessary description.

The magnetic head actuating mechanism will be described referring to FIG. 3.

Numerals 11 and 12 are the back surfaces of the main body of a camera 1. A pad 13 is provided on the back surface 12 of the main body, and presses the film 4 from the rear side to ensure that a mangetic head 8 securely comes into contact with the film 4. A spring 14 is provided at a back cover 9 to support a pressure plate 10. A bistable type solenoid 15 is fixed to pressure plate 10 through a supporting member 16, and consists of a hollow ring 15a having a coil (not shown) inside, a shaft 15b capable of sliding therein, and a convex portion 15c provided at one side of an end of the shaft 15b. One end of an elastic supporting plate 17 is fixed to the pressure plate 10 through a supporting member 18. On opposite sides of the other end of the supporting plate 17, the magnetic head 8, and a spring 19 and a patch 20 are provided.

Flowing current through the coil within the hollow ring 15a in a predetermined direction slides the shaft 15b downward, and flowing current in the opposite direction slides the shaft upward. The shaft 15b is stably held at respective down and up positions even if flowing of current through the coil is stopped, unless current flows in the opposite direction.

When the shaft 15b slides downward by flowing current through the solenoid 15, the patch 20 is pressed toward the film 4 by the convex portion 15c, and the spring 19 is thereby compressed, and at the same time, the supporting plate 17 bends to energize the magnetic head 8 toward the film 4 as shown in broken line. As a result, the magnetic head 8 is pressed against the film 4 with an appropriate pressure.

On the other hand, when the shaft 15b slides upward by flowing current through the solenoid 15 in the opposite direction, the patch 20 returns to the original position, and energizing due to the spring 19 and the supporting plate 17 is released to keep the magnetic head 8 away from the film 4.

The overall construction of a camera including the actuating mechanism for the above magnetic head 8 will be described referring to FIG. 2.

A photometric apparatus 21 meters the light in the photographing picture to output the brightness information. A motor actuating circuit 22 actuates a film feeding motor M. An exposure control portion 23 controls a shutter mechanism 24 and an aperture mechanism 25. A recording circuit 26 records the photographing information on the magnetic track on the film 4 through the magnetic head 8. A head actuating circuit 27 actuates the above-mentioned solenoid 15 to bring the magnetic head 8 into contact with and keep it away from the film 4. An indicating circuit 28 actuates an indicator 29 provided within the finder of the camera 1.

SW1 is a power switch for the camera 1. A switch SW2 turns on when the shutter release is half pushed, and a switch SW3 turns on when the shutter release is full pushed. A rewind switch SW4 rewinds the film 4. SW5 is a bracketing photograph mode switch, and a switch SW6 changes over to either a single photograph mode (S) or a continuous photograph mode (C).

A control circuit 30 consists of peripheral parts such as a microcomputer and a memory 30m, and controls recording of information by executing a control program as mentioned later.

Figure 4:
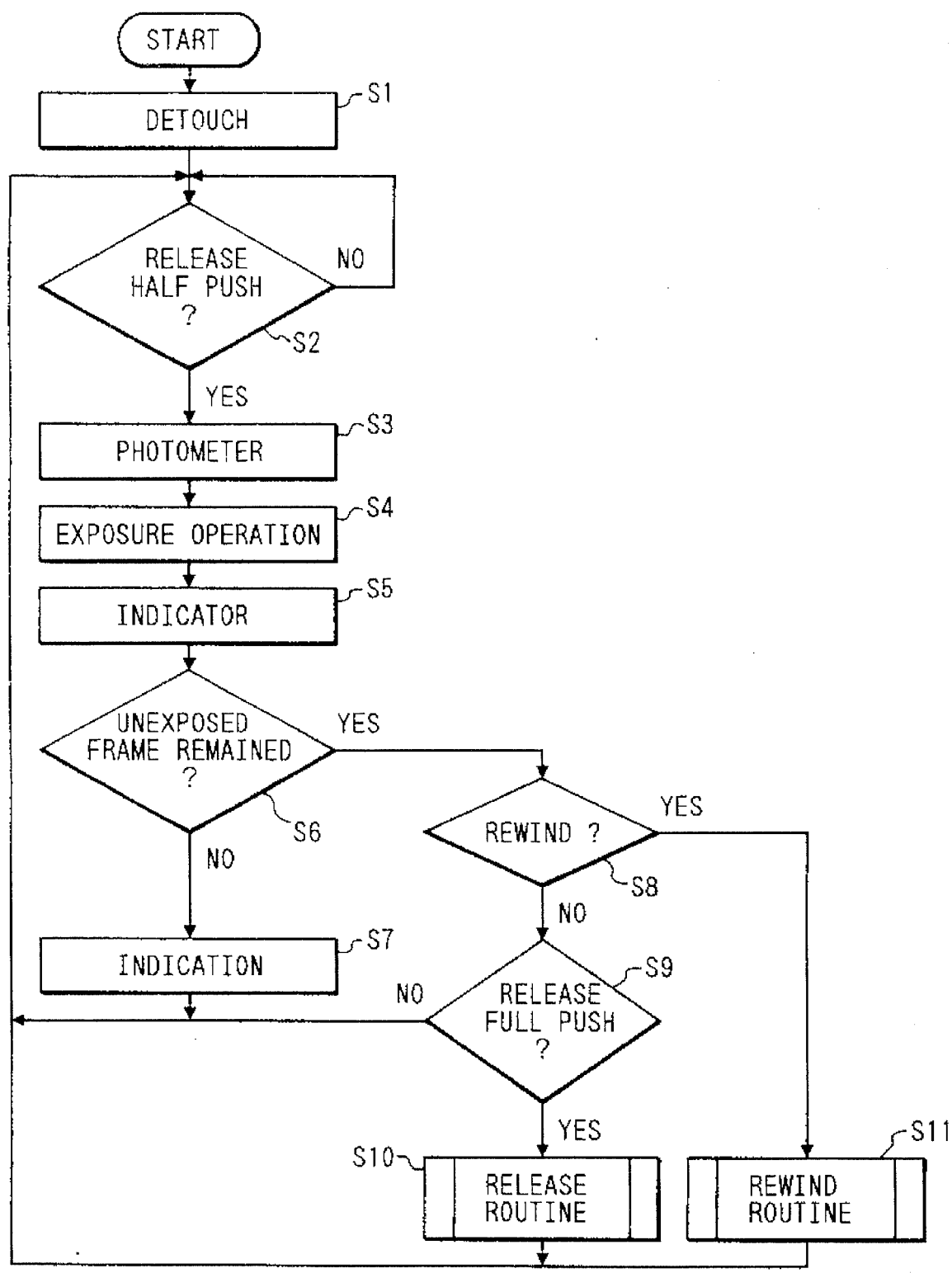
FIG. 4 is a flow chart showing the main routine of a control program to be executed by a microcomputer in the control circuit.

FIG. 4 is a flow chart showing the main routine of the control program. This program is executed when the camera power switch SW1 is turned on. The operation of the camera according to an embodiment will be described referring to FIG. 4.

First in step S1, the solenoid 15 is actuated through the head actuating circuit 27 to prevent any malfunction when the power is turned on, and the magnetic head 8 is put in the detouched state. In the following step S2, it is distinguished by the switch SW2 whether or not the shutter release has been half pushed, and this step is repeated until the shutter release is half pushed. When half pushed, the process proceeds to step S3 to meter the light by the photometric apparatus 21. Further in step S4, the appropriate exposure value is calculated on the basis of the brightness information from the photometric apparatus 21 and the sensitivity information of the film 4.

In step S5, the shutter speed and aperture value based on the calculated exposure value are indicated on the indicator 29 through the indicating circuit 28.

In step S6, it is distinguished by a film counter (not shown) whether or not any unexposed frame remains on the film 4, and if any unexposed frame remains, the process proceeds to step S8. If not, the process proceeds to step S7 to indicate a warning on the indicator 29, and thereafter returns to step S2. In step S8, it is distinguished whether or not rewind switch SW4 has been operated, and if the rewind switch SW4 has been operated, the process proceeds to step S11 to execute a rewind subroutine shown in FIG. 7. If not, the process proceeds to step S9 to distinguish by switch SW3 whether or not the shutter release has been full pushed. If full pushed, the process procceds to step S10 to execute a release subroutine shown in FIGS. 5A to 5C, and if not, the process returns to step S2.

Figure 5A:
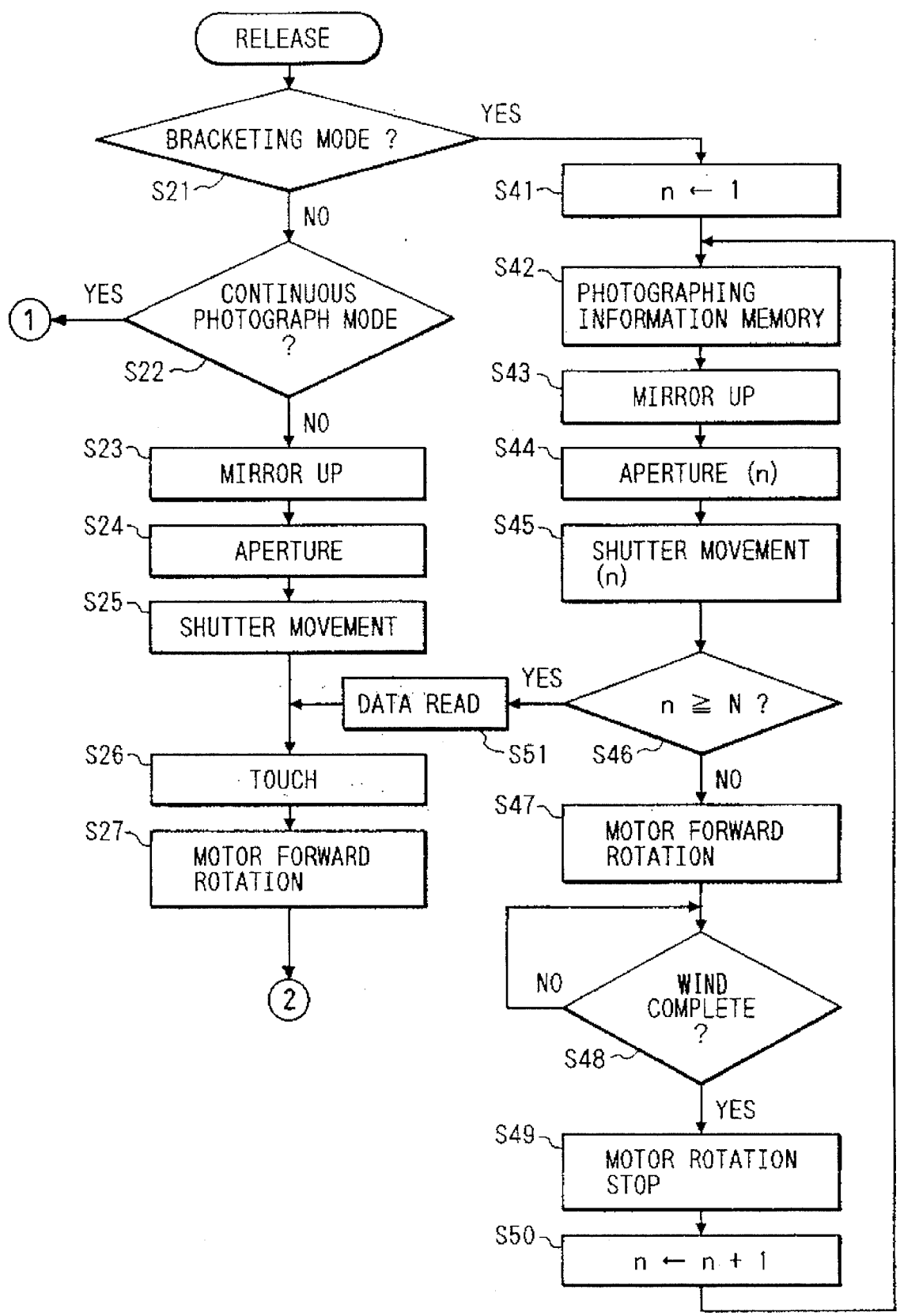
FIGS. 5A to 5C are flow charts showing the release subroutine.
Figure 5B:
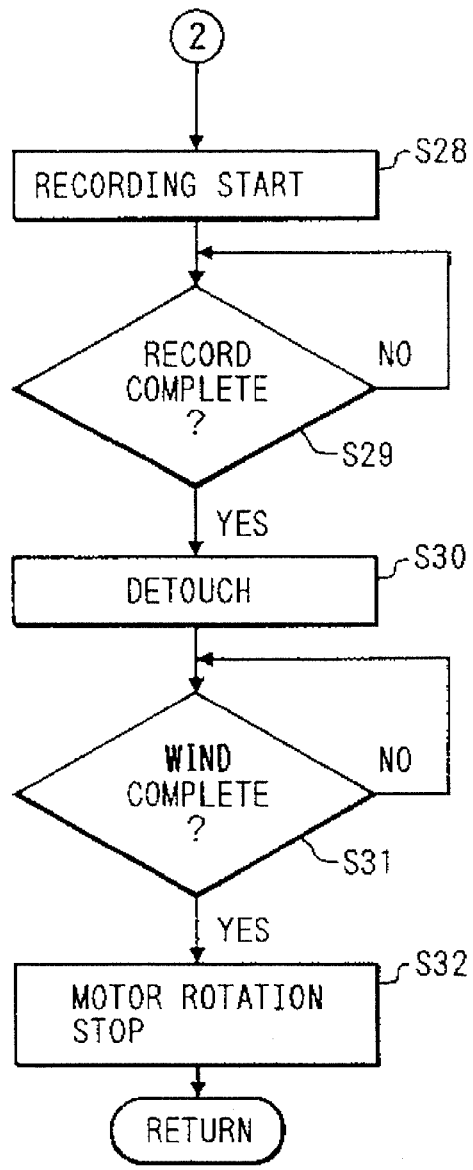

The operation when the shutter is released will be described referring to FIGS. 5A to 5C.

In this shutter release routine, a process during the shutter release will be performed in each photograph mode of the ordinary single photograph mode, the bracketing photograph mode and the high-speed, continuous wind photograph mode.

In step S21, it is distinguished by switch SW5 whether or not the bracketing photograph mode is used, and if the bracketing photograph mode is used, the process proceeds to step S41. If not, the process proceeds to step S22 to distinguish by the switch SW6 whether or not the high-speed, continuous wind photograph mode (C) is used. If the high-speed, continuous wind photograph mode (C) is used, the process proceeds to step S61 (FIG. 5C). If the ordinary single photograph mode (S) is used, the process proceeds to step S23.

The shutter release process in the ordinary single photograph mode will be first described.

In step S23, mirror up is performed to deviate a main mirror, which is between the photographing lens and the film 4, from the optical path of the photographing lens. In the following step S24, the lens is stopped down by operating the aperture mechanism 25 through the exposure control circuit 23. Then in step S25, the film 4 is exposed by operating the shutter mechanism 24 through the exposure control circuit 23.

In step S26, the solenoid 15 is actuated through the head actuating circuit 27 to touch the magnetic head 8 on the film 4. In the following step S27, one frame feeding of the film 4 is started by forward rotating the film feeding motor (M) through the motor actuating circuit 22. In step S28, recording of the photographing information such as photographing data and photographing date on photographing is started on the magnetic track 7 on the film 4 by actuating the recording circuit 26 and the magnetic head 8. Then in step S29, it is distinguished whether or not recording of the photographing information has been completed, and the same step is repeated until completed. After completed, the process proceeds to step S30.

In step S30, the solenoid 15 is actuated through the head actuating circuit 27 to allow the magnetic head 8 to detouch from the film 4. Further in step S31, it is distinguished by a film encoder (not shown) whether or not winding for one frame has been completed, and the same step is repeated until completed. Then when the next unexposed frame reaches the position opposite to the aperture and feeding of the one frame is completed, the process proceeds to step S32 to stop the film feeding motor (M) through the motor actuating circuit 22.

On completing the shutter release process in the above single photograph mode, the process returns to the main routine.

In the ordinary single photograph mode as mentioned above, the magnetic head 8 is allowed to touch the film 4 and feeding of one frame is started to record on the film 4 the photographing information on the photographed frame through the magnetic head 8 on completing the photographing, and after the recording is completed, the magnetic head 8 is allowed to detouch from the film 4.

The shutter release process in the bracketing photograph mode will be described.

In step S41, 1 is set to a counter n which counts a number of photographed frames in the bracketing photograph mode. Then in step S42, the photographing information for the first frame is stored in the memory 30m. At this time, the photographing information is stored in the memory 30m by forming a pair with the number of photographed frame counted by the film counter (not shown). After performing mirror up in the following step S43, aperture operation is conducted in accordance with the aperture value for the first frame in step S44, and further exposure is performed in accordance with the shutter speed for the first frame in step S45.

In step S46, it is distinguished whether or not the value of the frame number counter n has reached a predetermined number of frames N, and if n≧N, the process proceeds to step S51. Otherwise, the process proceeds to step S47. After forward starting the film feeding motor (M) in step S47, it is distinguished in step S48 whether or not winding of one frame has been completed, and the same step is repeated until completed. Then when the next photograph frame has reached the predetermined photographing position, the process proceeds to step S49. After stopping the motor (M) in step S49, the process proceeds to step S50 to increment the frame number counter n. Thereafter, the process returns to step S42 to expose the second frame.

At the time when it is distinguished in step S46 that bracketing photographing for the predetermined number of frames N has been completed, the last frame has been just exposed for the bracketing photographing, that is, immediately before feeding of the last one frame is performed. Prior to feeding of this one frame, the photograph frame No. and the photographing information of that frame stored in the memory 30m on bracketing photographing are read out in step S51. Thereafter, the process proceeds to step S26 to touch the magnetic head 8 on the film 4 and to forward start the motor (M) in step S27 in the same manner as mentioned above, and to record, on the film 4, the photographing information for each frame on bracketing photographing read out from the memory 30m during feeding of one frame. By allowing the photographed film number and the photographing information for that frame to form a pair at this time, these are successively recorded for the first frame on the bracketing photographing.

After recording of all the photographing information has been completed, the magnetic head 8 is allowed to detouch from the film 4, and further after feeding of the frame is completed, feeding of the film is stopped. Thereafter, the process returns to the main routine.

Figure 6:
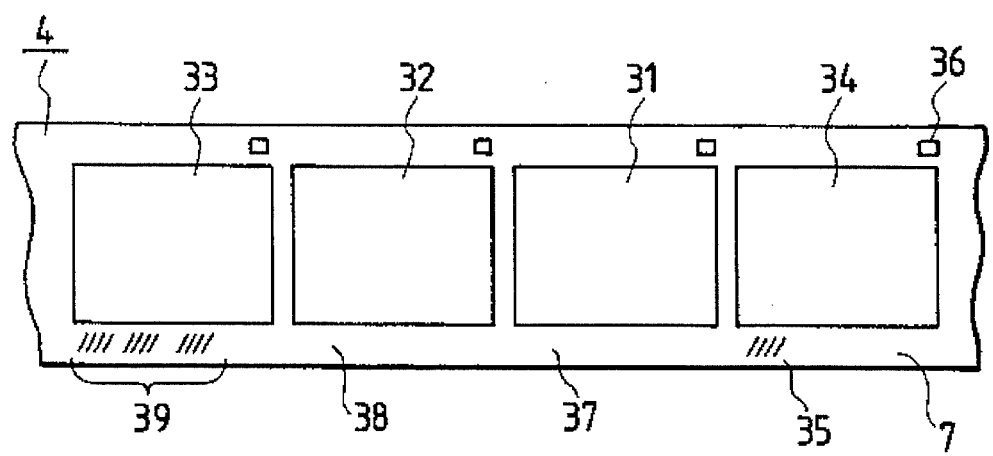
FIG. 6 is a view showing an example of recording of the photographing information recorded by executing the release subroutine.

FIG. 6 shows the recording state of the photographing information after bracketing photographing is performed with the number of photographing frames N=3.

In FIG. 6, numerals 31, 32 and 33 show the first, the second and the last frame respectively. A frame 34 has been photographed immediately before photographing in the bracketing mode is performed, and numeral 35 shows the recording position for the photographing information for that frame. Perforation 36 are used to count the number of frames and position each frame to a predetermined photographing position.

As mentioned above, the first frame 31 is first exposed after photographing in this mode is started, and then the second frame 32 and the third frame 33 are successively exposed. At this time, the photographing information for the first frame 31 and the second frame 32 is not recorded at the predetermined recording positions 37 and 38 for the respective frames, but is stored in the memory 30m. The photographing information for the first to third frames is collectively recorded by forming a pair with the respective photographed frame numbers at the predetermined recording position 39 for the third frame when one frame is fed after photographing of the third frame 33 is completed.

In the bracketing photograph mode, the photographing information for all the frames on photographing is first left stored in the memory 30m and, on feeding one frame after completion of photographing of the last frame, is collectively recorded at the predetermined recording position for that frame. Therefore, the photograph time interval is reduced by a duration required for touching and detouching the magnetic head 8 for each photographed frame, and high-speed, continuous photographing can be performed without missing photographing opportunities.

The shutter release process in the high-speed continuous wind photograph mode will be described.

Figure 5C:
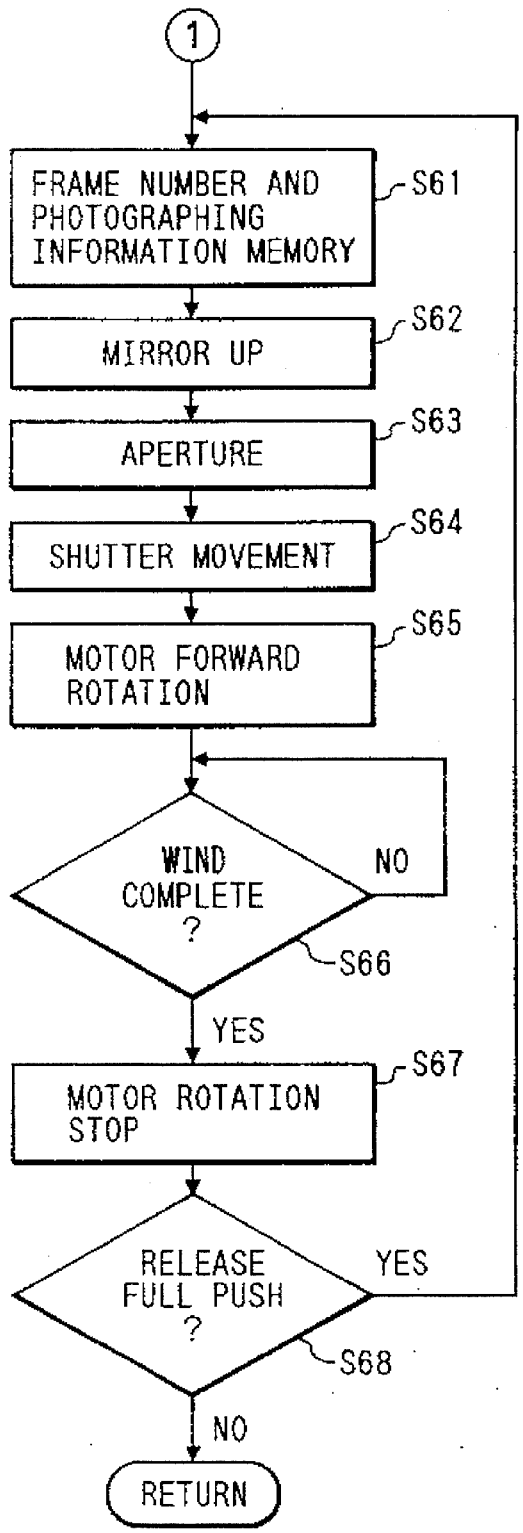

In step S61 in FIG. 5C, the frame number of the first frame, in which photographing is started in this mode, and the photographing information for that frame are stored in the memory 30m. In steps S62 to S64, mirror up, aperture movement and shutter movement are performed in the same manner as mentioned above for exposure for the first frame. After the exposure, the motor (M) is rotated forward in step S65, and it is distinguished in the following step S66 whether or not winding of one frame has been completed. The same step is repeated until completed, and after the winding is completed, the motor (M) is stopped in step S67.

Further in step S68, it is distinguished by a switch SW3 whether or not the shutter release has remained full pushed, and if remained full pushed, the process returns to step S61 to start the photograph operation for the next frame. If the shutter release has not been full pushed, the process returns to the main routine to finish the high speed, continuous wind photograph mode.

In the high-speed, continuous wind photograph mode, photographing is continuously performed while the shutter release is being full pushed, and the photographing information for each frame is stored in the memory 30m together with the frame number of that frame. Therefore, the magnetic head 8 is not touched and detouched to record the information during photographing, and the photograph time interval is reduced by that duration, and high-speed continuous photographing can be performed without missing photographing opportunities. The information for each photograph frame photographed in this mode is recorded at the predetermined information recording positions for those frames when rewinding the film 4 into the cartridge as mentioned later.

Figure 7:
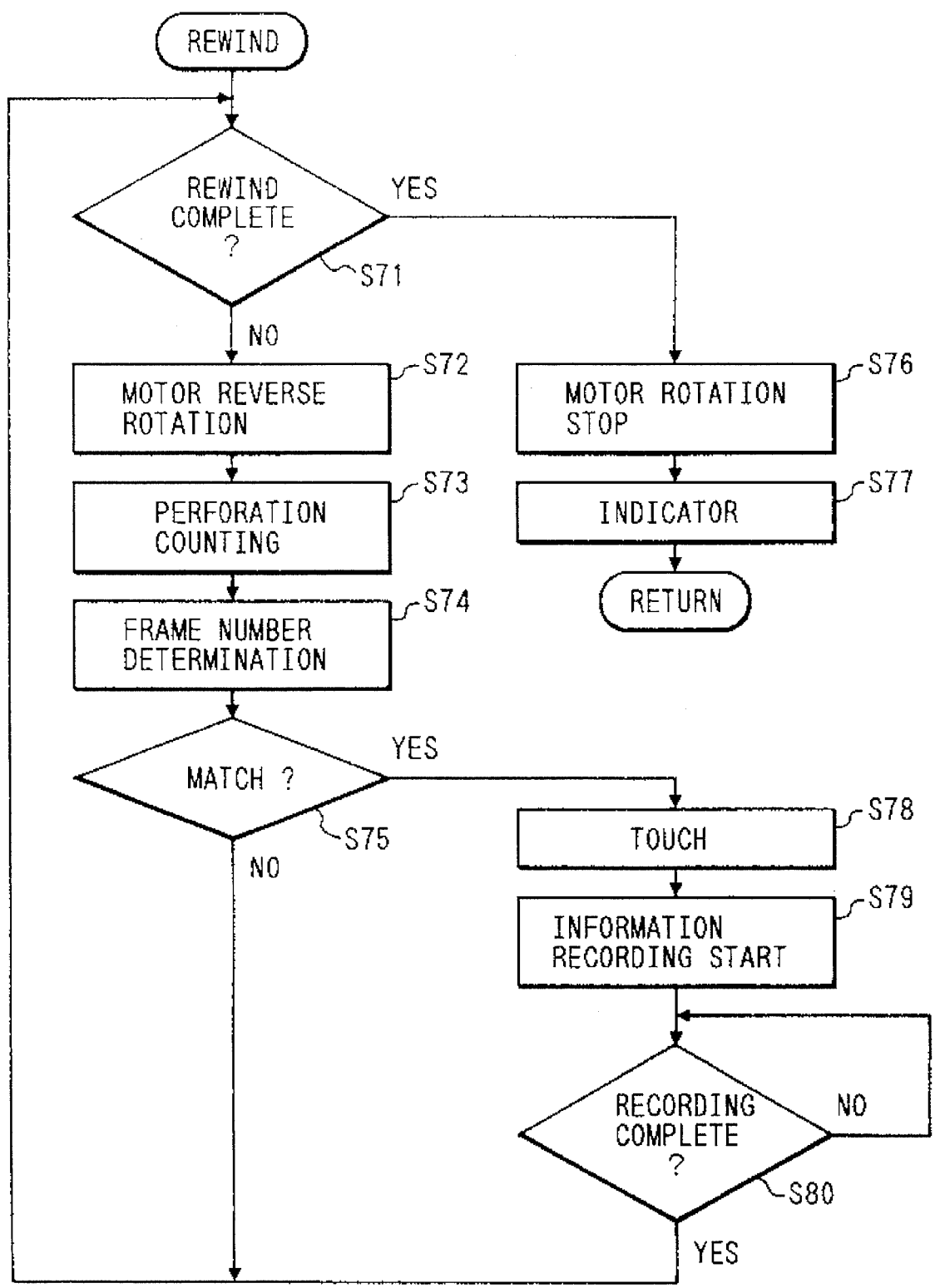
FIG. 7 is a flow chart showing the rewind subroutine.

FIG. 7 is a flow chart showing the rewind subroutine. The operation of recording, on the film 4, the photographing information stored in the memory 30m in the high-speed continuous wind photograph mode while rewinding the film 4 into the cartridge 2 will be described referring to FIG. 7.

In step S71, it is distinguished by a film encoder (not shown) whether or not rewind of the film has been completed, and if not completed, the process proceeds to step S72 to reverse the motor (M) for rewinding. In step S73, counting of perforations 36 is started on the film 4, and in the following step S74, the frame number of the photographed frame which passes the magnetic head 8 is determined from the counting result.

In step S75, it is distinguished whether or not there is any frame coinciding with the frame number, which is now being fed, among frame numbers stored in the memory 30m, and if there is none coinciding, the process returns to step S71 to resume rewinding the film 4. If there is any one coinciding, the process proceeds to step S78.

In step S78, the magnetic head 8 is allowed to touch the film 4, and in the following step S79, the photographing information for the coincided frame number is read out from the memory 30m to record it at the predetermined recording position for the frame on the film 4 through the magnetic head 8. To set the direction of recording the photographing information on the film 4 to a direction of recording during rewinding which has been performed in the above-mentioned release routine at this time, the photographing information signal is transmitted to the magnetic head 8 by reversing the before and after relationship of the photographing information signal from the recording circuit 26.

In step S80, it is distinguished whether or not recording has been completed, and the same step is repeated until completed. After completed, the process returns to step S71.

The photographing information for each frame stored in the memory 30m in the high-speed, continuous wind photograph mode shown in FIG. 5C is recorded at the predetermined recording position for the frame when rewinding the film.

When continuous photographing is performed at high speed as described above, the photographing information is not recorded by touching and detouching the magnetic head for each photographing, but the information is first stored in the memory, and is collectively recorded at the last photographing frame during continuous photographing, or is recorded at the predetermined positions of the respective frames when rewinding the film. Therefore, the photograph time interval is reduced by the touch and detouch duration of the magnetic head, and at the same time, no contact resistance occurs as when the magnetic head is allowed to touch the film, enabling feeding the film at high speed and continuous photographing at high speed without missing photographing opportunities.

In the above embodiment, the photographing information has been collectively recorded at the last photographed frame in the bracketing photograph mode. When there are many photographed frames, however, the photographing information for each predetermined number of frames may be collectively recorded, and the information may be recorded when rewinding the film in the same manner as in the high-speed continuous wind photograph mode.

Also in the above embodiment, the photographing information stored in the memory has been read out to record it on the film after high-speed continuous photographing. However, the photographing information may be left stored, for example, in an IC card, etc., and be enlarged on the basis of the photographing information read out from the IC card on printing.

Further in the above embodiment, during high-speed continuous photographing, the magnetic head was not touched and detouched, but the photographing information was left stored in the memory and was collectively recorded at the predetermined position of the last photographing frame, or was recorded at the predetermined position of the respective photographing frames when rewinding the film. On continuously photographing at high speed, however, the photographing information may be recorded with the magnetic head touched when feeding one frame after exposure.

Figure 8A:
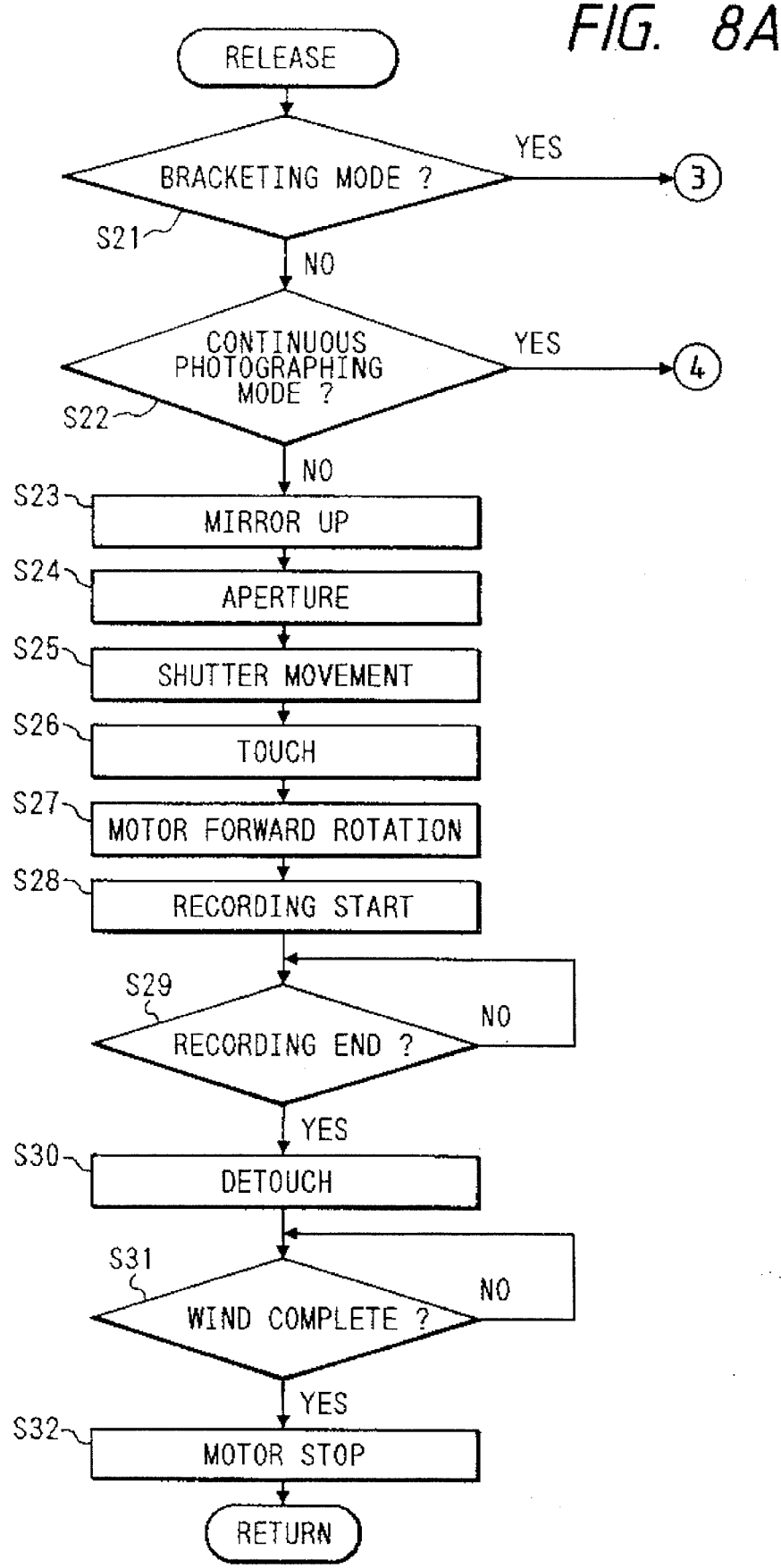

The operation of this modified example will be described referring to FIGS. 8A and 8B. For the steps for performing the same process as in FIGS. 5A to 5C, the same step numbers are affixed.

When steps S21 and S22 have been negated, the single photograph mode is executed, in which the photographing information is recorded while touching and detouching the magnetic head 8 for each photograph frame as mentioned above. When the mode is found to be the bracketing photograph mode in step S21, the magnetic head 8 is first allowed to touch the film 4 in step S90 (FIG. 8B).

After setting the frame number counter n to 1 in step S91, the first frame is exposed in steps S92 to S94, and feeding of one frame is started by forward rotating the motor (M) in step S95. In the following step S96, the photographing information for the photographed frame is recorded at the predetermined position. In step S97, it is distinguished whether or not winding of one frame has been completed, and the same step is repeated until completed. Then after completed, the process proceeds to step S98 to stop the motor (M).

After incrementing the frame number counter n in step S99, it is distinguished in step S100 whether or not photographing of the predetermined number of photographed frames N has been completed, and if completed, the process returns to the main routine by detouching the magnetic head 8 in step S110. If photographing has not been completed, the process returns to step S92 to photograph the next frame.

When the mode has been found to be the high-speed continuous wind photograph mode in step S22, the process proceeds to step S101 to allow the magnetic head 8 to touch the film 4. In steps S102 to S104, exposure is performed, and in the following step S105, feeding of one frame is started by forward rotating the motor (M). In step S106, the photographing information for the photographed frame is recorded. Further in step S107, it is distinguished whether or not winding of one frame has been completed, and the same step is repeated until completed. Then after completed, the process proceeds to step S108 to stop the motor (M).

In step S109, it is distinguished by the switch SW3 whether or not the shutter release has been full pushed, and if it remains full pushed, the process returns to the step S102 to expose the next photographing frame. If not full pushed, the process proceeds to step S110 to return to the main routine and detouching the magnetic head 8 from the film 4.

In the above examples, high-speed continuous photographing is performed by repeating exposure, feeding of one frame and recording of the photographing information with the magnetic head touched, and the magnetic head is allowed to detouch after completion of the continuous photographing. Therefore, the photograph time interval can be reduced by a duration for touching and detouching the magnetic head for each feeding of one frame. For high-speed continuous photographing the feeding speed becomes slightly slower owing to the contact resistance of the magnetic head while the film is being fed.

In the above embodiment and its modified example, the photograph scene was recorded on a recording medium made of silver salt film, and the photographing information for each frame on the magnetic recording medium applied on the film respectively. The recording medium, however, is not limited to such film or magnetic recording medium. The present invention can be applied to any media on which recording can be performed while touching and detouching the recording head during recording. For example, magnetic disks or light magnetic disks may be used. Further as regards the method for recording the photographing information, it is not limited to the magnetic type, but any method to optically record may be used.

In the construction of the above embodiment, a selector switch SW5 for the bracketing photograph mode and switch SW6 for the single photograph mode and the continuous photograph mode constitutes the selecting means, the control circuit 30 the control means, the memory 30m the memory means, the magnetic head 8 the record means, the film 4 the first recording medium, and the magnetic recording medium 7 (magnetic track) the second recording medium respectively.

What is claimed is:

1. A camera equipped with magnetic recording apparatus for recording information regarding photograph film frames, the recording apparatus including a recording head and using a recording medium that is advanced concurrently with the film, comprising:

a selector which selects either one of a first photographing mode and a second photographing mode;

a memory which stores information to be recorded regarding photograph film frames; and a controller which controls engagement and disengagement of said recording head with said recording medium and which controls information recording, said controller operating, when said first photographing mode is selected, to cause said recording head to engage said recording medium during a single-frame advancement of said film after a single-frame exposure, for recording single-frame information, and to be disengaged from said recording medium before a next exposure, said controller operating, when said second photographing mode is selected, to cause said recording head to be disengaged from said recording medium and to cause said memory to store plural-frame information during exposure and advancement of a plurality of film frames and then to cause said recording head to engage said recording medium for recording the stored plural-frame information collectively.

2. A camera according to claim 1, wherein said first photographing mode is a single-frame photographing mode and said second photographing mode is a continuous photographing mode.

3. A camera according to claim 2, wherein said second photographing mode is a bracketing photographing mode.

4. A camera according to claim 2, wherein said second photographing mode is a high-speed continuous photographing mode.

5. A camera equipped with magnetic recording apparatus for recording information regarding photograph film frames, the recording apparatus including a recording head and using a recording medium that is advanced and rewound concurrently with the film, comprising:

a selector which selects either one of a first photographing mode and a second photographing mode;

a memory which stores information to be recorded regarding photograph film frames; and a controller which controls engagement and disengagement of said recording head with said recording medium and which controls information recording, said controller operating, when said first photographing mode is selected, to cause said recording head to engage said recording medium during a single-frame advancement of said film after a single-frame exposure, for recording single-frame information, and to be disengaged from said recording medium before a next exposure, said controller operating, when said second photographing mode is selected, to cause said recording head to engage said recording medium during rewinding of said film, for recording stored film frame information.

6. A camera equipped with magnetic recording apparatus for recording information regarding photograph film frames, the recording apparatus including a recording head and using a recording medium that is advanced concurrently with the film, comprising:

a selector which selects either one of a first photographing mode and a second photographing mode; and a controller which controls engagement and disengagement of said recording head with said recording medium and which controls information recording, said controller operating, when said first photographing mode is selected, to cause said recording head to engage said recording medium during a single-frame advancement of said film after a single-frame exposure, for recording single-frame information, and to be disengaged from said recording medium before a next exposure, said controller operating, when said second photographing mode is selected, to cause said recording head to engage said recording medium and to remain engaged with said recording medium during continuous advancement of said film by an amount corresponding to a plurality of film frames, for recording information frame-by-frame.

7. A camera having a camera body which is used with a film loaded therein for exposure and feeding of film frames, said film having a magnetic recording medium for recording various information as to photographing, said camera comprising:

a magnetic head which records said information on said recording medium during feeding of said film with said magnetic head abutting said recording medium;

a magnetic head moving member which moves said magnetic head to a retraction position in which said magnetic head is retracted from said recording medium or an abutment position in which said magnetic head abuts said recording medium;

a selecting member operable externally of said camera body to select either a one-frame photographing mode or a continuous photographing mode, said one-frame photographing mode being a mode in which only one film frame is exposed and then fed, said continuous photographing mode being a mode in which a plurality of film frames are exposed and fed continuously; and a controller which controls the movement of said magnetic head by said magnetic head moving member, wherein, when said selecting member has been operated to select said one-frame photographing mode, said controller controls said magnetic head moving member to move said magnetic head to said abutment position after exposure of one film frame, to maintain said magnetic head at said abutment position while said one film frame is fed, and to move said magnetic head from said abutment position to said retraction position after said one film frame has been fed, and wherein, when said selecting member has been operated to select said continuous photographing mode, said controller controls said magnetic head moving member so that said magnetic head is maintained at said abutment position continuously during exposure and feeding of a plurality of film frames and is moved from said abutment position to said retraction position after a plurality of film frames have been exposed and fed.

8. A camera according to claim 7, further comprising:

a release member operable to start photographing, and a feeding member for feeding of said film, wherein when said one-frame photographing mode has been selected by operation of said selecting member, said feeding member operates in said one-frame mode in response to an operation of said release member, and wherein when said continuous photographing mode has been selected by operation of said selecting member, said feeding member operates in said continuous photographing mode in response to an operation of said release member.

9. A camera having a magnetic recording apparatus for recording information as to frames of a photographing film, said magnetic recording apparatus using a recording medium fed together with said film and including a recording head, said camera comprising:

an operation member operable to select either a first photographing mode employing one-frame photographing or a second photographing mode employing auto-bracketing photographing; and a controller which controls abutment and non-abutment of said recording head and said recording medium and which controls information recording, wherein when said first photographing mode has been selected by said operation member, said controller places said recording head in abutment with said recording medium in order to record information as to one film frame while said film is fed by one frame after exposure of said one frame and then places said recording head in non-abutment with said recording medium before exposure of another frame, and wherein when said second photographing mode is selected, said controller places said recording head in abutment with said recording medium in synchronization with the starting of auto-bracketing photographing, maintains said recording head in abutment with said recording medium during auto-bracketing photographing, and then places said recording head in non-abutment with said recording medium in synchronization with completion of feeding of said film by said auto-bracketing photographing.

10. A method of recording information in a camera having a magnetic recording apparatus that includes a recording head and a recording medium that is advanced with a film, wherein the camera is operable selectively in either a first photographing mode or a second photographing mode, said method comprising:

selecting one of said photographing modes;

if said first photographing mode is selected, abutting said recording head with said recording medium and recording one-frame information while said film is fed by one frame after exposure of one frame, and then retracting said recording head from said recording medium before exposure of another frame, and if said second photographing mode is selected, storing a plurality of frame information in a memory while a plurality of frames are exposed and fed and while said recording head is retracted from said recording medium, and thereafter abutting said recording head with said recording medium and recording the stored information while said film is fed.

11. A method of recording film frame information in a camera operable selectively in either a first photographing mode or a second photographing mode, said camera having a magnetic recording apparatus including a recording head and a recording medium that is advanced or rewound together with a film, comprising:

selecting one of said photographing modes;

if said first photographing mode is selected, abutting said recording head with said recording medium and recording one-frame information while said film is advanced by one frame after exposure of one frame, and then retracting said recording head from said recording medium, and if said second photographing mode is selected, storing film frame information in a memory, abutting the recording head with the recording medium and recording the stored information while the film is rewound.

12. A method of recording various photographing information in a camera having a camera body which is used with a film loaded therein for exposure and feeding of film frames, said film having a magnetic recording medium, said camera body having a magnetic head which may be placed in abutment or non-abutment with said recording medium, said camera being operable, selectively, in a one-frame photographing mode or a continuous photographing mode by photographer-operation of a member external to said camera body, said method comprising:

operating said member to select one of said photographing modes;

discriminating which of said photographing modes is selected;

if said one-frame photographing mode is selected, moving said magnetic head into abutment with said recording medium after exposure of one film frame, maintaining said magnetic head in abutment with said recording medium while said film is fed by one frame, and thereafter moving said magnetic head into non-abutment with said recording medium, and if said continuous photographing mode is selected, maintaining said magnetic head in abutment with said recording medium during a plurality of sequential exposures and feeding of film frames, and thereafter moving said magnetic head into non-abutment with said recording medium.

13. A method of recording information in a camera having a magnetic recording apparatus including a recording head and a recording medium which is fed together with a film, said camera being operable, selectively, in a first photographing mode for one-frame photographing or a second photographing mode for auto-bracketing photographing by photographer-operation of a member external to the camera, said method comprising:

operating said member to select one of said photographing modes;

discriminating which of the photographing modes is selected;

if said first photographing mode is selected, abutting said recording head with said recording medium in order to record one frame information on said recording medium while said film is fed by one frame after exposure of one frame, and thereafter retracting said recording head from said recording medium before exposure of another frame;

and if said second photographing mode is selected, abutting said recording head with said recording medium in synchronization with starting of auto-bracketing photographing, maintaining abutment of said recording head with said recording medium while said film is fed during auto-bracketing photographing, and thereafter retracting said recording head from said recording medium in synchronization with the completion of feeding of said film in auto-bracketing photographing.

14. A recording apparatus capable of loading a photographing film provided with a recording medium comprising:

a feeding device which feeds said recording medium with said photographing film;

a recording head which records film frame information on said recording medium by engaging said recording head with said recording medium;

a mode selecting member which selects either of a first mode and a second mode;

a memory which stores film frame information; and a controller which, when said first mode is selected, causes said recording head to engage said recording medium while a single film frame is fed by said feeding device and causes said recording head to disengage said recording medium when feeding of said single film frame is completed, and which, when said second mode is selected, causes said memory to store information regarding a plurality of said film frames while said plurality of film frames are fed by said film feeding device and thereafter causes said recording head to engage said recording medium.

15. A recording apparatus capable of loading a photographing film provided with a recording medium comprising:

a feeding device which advances and rewinds said recording medium with said photographing film;

a recording head which records film frame information on said recording medium by engaging said recording head with said recording medium;

a mode selecting member which selects either of a first mode and a second mode;

a memory which stores film frame information; and a controller which, when said first mode is selected, causes said recording head to engage said recording medium while a single film frame is advanced by said feeding device and causes said recording head to be disengaged from said recording medium when advancing of the single film frame is completed, and which, when said second mode is selected, causes said recording head to engage said recording medium when said film is rewound by said feeding device, to record information stored by said memory on said recording medium.

16. A recording apparatus capable of loading a photographing film provided with a recording medium comprising:

a feeding device which feeds said recording medium with said photographing film;

a recording head which records film frame information on said recording medium by engaging said recording head with said recording medium;

a mode selecting member which selects either of a first mode and a second mode; and a controller which, when said first mode is selected, causes said recording head to engage said recording medium while a single frame of said film is fed by said feeding device and causes said recording head to be disengaged from said recording medium when feeding of said single frame is completed, and which, when said second mode is selected, causes said recording head to engage said recording medium while an amount of film corresponding to a plurality of frames of said film is fed by said feeding device.

17. An information processing apparatus capable of loading a photographing film provided with a magnetic recording medium comprising:

a feeding device which feeds said magnetic recording medium with said photographing film;

a magnetic head which magnetically processes film frame information by engaging said magnetic head with said magnetic recording medium;

a mode selecting member which selects either of a first mode and a second mode; and a controller which, when said first mode is selected, causes said magnetic head to engage said magnetic recording medium while a single frame of said film is fed by said feeding device and causes said magnetic head to be disengaged from said magnetic recording medium when feeding of said single frame is completed, and which, when said second mode is selected, causes said magnetic head to engage said magnetic recording medium while an amount of film corresponding to a plurality of frames of said film is fed by said feeding device.

* * * * *